Dec. 1, 1925.  
K. EHRGOTT  
ELECTRICALLY HEATED DEVICE  
Filed April 21, 1924

1,563,348

WITNESSES:
R. S. Harrison
H. M. Biebel

INVENTOR
Karl Ehrgott
BY
Wesley G. Carr
ATTORNEY

Patented Dec. 1, 1925.

1,563,348

UNITED STATES PATENT OFFICE.

KARL EHRGOTT, OF EAST PITTSBURGH, PENNSYLVANIA, ASSIGNOR TO WESTING-HOUSE ELECTRIC & MANUFACTURING COMPANY, A CORPORATION OF PENNSYLVANIA.

ELECTRICALLY-HEATED DEVICE.

Application filed April 21, 1924. Serial No. 707,828.

*To all whom it may concern:*

Be it known that I, KARL EHRGOTT, a citizen of the United States, and a resident of East Pittsburgh, in the county of Allegheny and State of Pennsylvania, have invented a new and useful Improvement in Electrically-Heated Devices, of which the following is a specification.

My invention relates to electrically heated devices and particularly to means for connecting electric heating elements therefor.

The object of my invention is to provide a relatively simple means for protecting a connecting conductor for the electric heating elements in co-operating casings for electric cooking appliances.

In practicing my inventinon, I provide a pair of co-operating casings of an electrically-heated cooking appliance with a pair of spaced hinge sets and located therebetween hollow lugs extending from the respective casings. A tubular connecting member interfits with said lugs and a flexible conductor extends therethrough and through the tubular connecting members into the respective casings.

Figure 1:
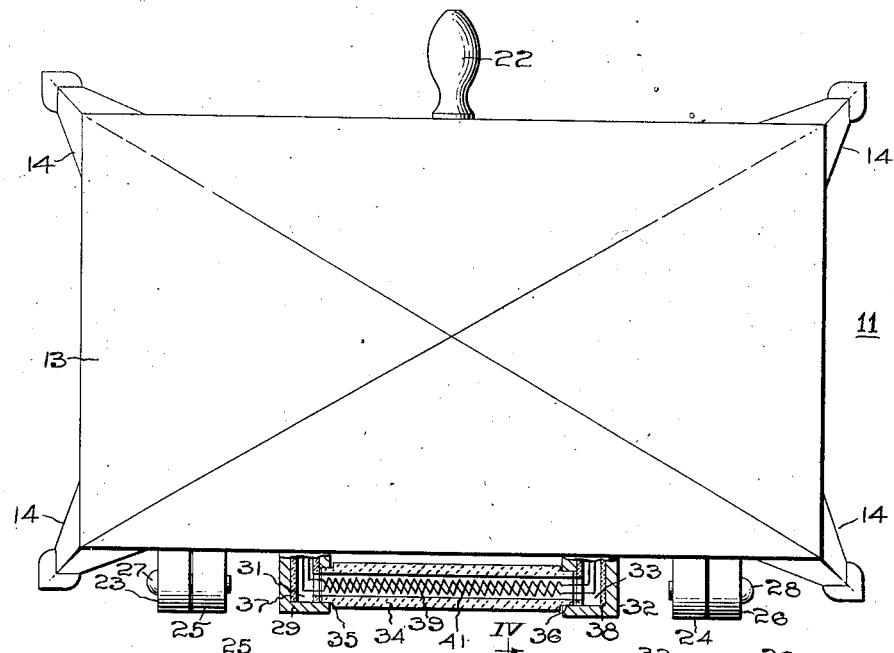
Figure 2:
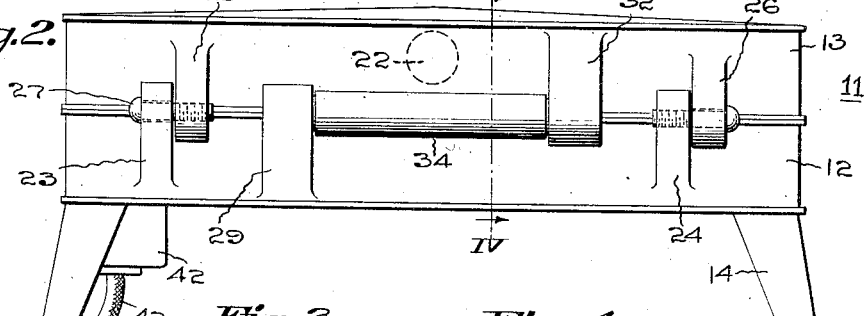
Figure 3:
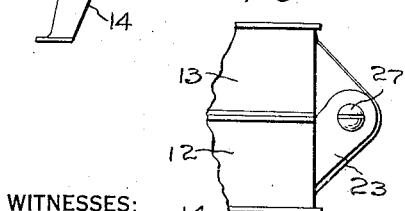
Figure 4:
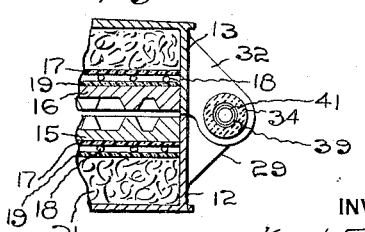

In the single sheet of drawings,

Figure 1 is a top plan view of a waffle iron embodying my invention, a portion thereof being shown in horizontal section, Fig. 2 is a view in rear elevation thereof, Fig. 3 is a fragmentary view in end elevation thereof, and Fig. 4 is a fragmentary vertical sectional view thereof taken on the line IV—IV of Fig. 2.

A waffle iron designated generally by the numeral 11, comprises a lower metal casing 12 and an upper metal casing 13. While any desired shape or contour of casings may be employed, I have here illustrated them as being of substantially rectangular shape. The lower casing is provided with a plurality of supporting members 14, one being attached to the casing at each corner thereof.

Each of the casings 12 and 13 is provided with a suitable baking surface 15 and 16, respectively, that is located within the otherwise open part of the casings. A heating element for each of the casings comprises a sheet 17, of a suitable electric-insulating material, such as mica, that is in operative engagement with the inner face of the baking surface, a resistor member 18 and a second sheet 19, of electric-insulating material. A mass 21 of a suitable heat insulating material, such as mineral wool, may be employed to fill in the otherwise unoccupied part of the respective casings, and is effective also to reduce the amount of heat that is lost by the heating element away from the baking surface.

I have illustrated the baking surfaces 15 and 16 as being provided with suitable projections or indentations of the kind usually employed in waffle irons. The construction of the heating element that is mounted in the upper casing 13 is substantially the same as that described for the lower casing 12. While I have illustrated and described a particular embodiment of heating element for the baking surfaces and casings, I do not desire to be limited thereto, as any suitable construction may be used.

The upper casing 13 is provided with a suitable handle member 22, properly mounted thereon at the front thereof in order to permit of varying the angular position of the upper casing 13 relatively to the lower casing 12.

The lower casing 12 is provided with a pair of spaced hinge lugs 23 and 24 that extend angularly upwardly from the casing. The upper casing 13 is provided with a pair of spaced hinge lugs 25 and 26 that extend angularly outwardly and downwardly and co-operate with the lugs 23 and 24, respectively.

Means for pivotally connecting the pairs of hinge lugs 23 and 25, 24 and 26, respectively, may be constituted by suitable machine bolts 27 and 28, respectively, that extend loosely through one of the lugs and into the other co-operating lug with which they have screw-threaded engagement, as is shown more particularly in Fig. 2 of the drawings.

While I have illustrated a specific embodiment of hinge structures, it is evident that any suitable or desired construction of hinges may be employed.

It is highly desirable in waffle irons that a relatively compact and efficient means be provided for protecting the connecting leads extending from the heating element in the upper casing to the heating element in the lower casing. The lower casing 12 is provided with a hollow lug member 29, extending angularly upwardly from the casing and located between the two hinge lugs 23 and 24 and closer to the lug 23 than to the lugs 24. The member 29 may be integral with the casing if such construction is mechanically possible, as where the casing comprises a casting, or it may be of punched sheet metal construction, and suitably secured against the casing.

The hollow lug 29 is provided with a chamber 31 extending at substantially right angles rearwardly from the casing 12, as is illustrated more particularly in the sectional view of Fig. 1 of the drawing.

A substantially similar hollow lug 32 is either integral with or mounted against the upper casing 13 and extends angularly outwardly and downwardly. It is provided with a chamber portion 33 that extends at substantially right angles to the rear face of the casing 13.

The outer ends of the two hollow lugs 29 and 32 are located in substantial alinement with each other and also in alinement with the hinge pins 27 and 28. A tubular member 34, of electric-insulating material, extends between the outer ends of the hollow lugs 29 and 32, each end interfitting with a laterally extending opening 35 and 36, of the respective lugs 29 and 32. The chambers 31 and 33 of the respective lugs have located therein suitable tubular members 37 and 38, of electric-insulating material.

One end of the resistor member 18, located in the casing 12, is suitably connected to a conductor 39 that is made flexible by being wound into substantially helical form, more particularly within the tubular member 34. The member 39 extends from the casing 12 through the member 37 into the chamber 31 and through the tubular member 34 between the two opposed open ends of the hollow lugs 29 and 32, and then into and through the tubular member 38 located in the chamber 33 and from there into the upper casing 13 where it is suitably connected to the resistor member located in that casing. The other end of the resistor member located in the upper casing 13 is connected to a second conductor 41 that extends through the tubular members 38, 34 and 37 and back into the lower casing.

The two free ends of the resistor member are brought to a terminal box 42 into which there extends also one end of a suitable double supply circuit conductor 43. The other end of the supply circuit conductor 43 is connected to the usual standard terminal plug (not shown).

The hinge members provided in the respective upper and lower casings are so mounted that the upper casing may be moved away from the lower casing in a direction substantially parallel to the face of the baking surface after the hinge pins have been removed therefrom. This construction permits of easily and quickly mounting the tubular member 34 connecting the hollow lug members, in its proper operative position relatively to the lug members and interfitting therewith.

It is understood, of course, that the conductors 39 and 41 are threaded through the hollow lugs and through the tubular member before the final complete assembly of the various parts of the waffle iron in their proper operative positions therein. The conducting leads may be placed in their proper operative positions in the lugs and the connecting tubular member before even the two casings are pivotally mounted relatively to each other, after which proper connection thereof may be made to the upper and lower resistor members hereinbefore described.

The device embodying my invention thus provides a structure that is effective to protect the connecting leads extending from the upper to the lower casing, this structure comprising hollow lug members that have their outer ends in substantial alinement with each other and with the hinge pins that connect the upper and the lower casing.

Various modifications and changes may be made without departing from the spirit and scope of the invention, I desire therefore that only such limitations shall be placed thereon as are imposed by the prior art.

I claim as my invention,

1. In a waffle iron, the combination with a pair of co-operating electrically heated casings, and a plurality of hinges operatively connecting said casings, of hollow lug members extending from said casings and having their outer end portions alined with the axis of said hinges, a tubular connecting member extending between and supported by said lugs, and a flexible conductor located in and extending through said lugs and tubular member for electrically connecting the heating elements in said casings.

2. In a waffle iron, the combination with a pair of co-operating electrically heated casings, and a plurality of hinges operatively connecting said casings, of hollow lug members extending from said casings and having outer laterally-extending end portions located in opposed spaced relation and in alinement with the axis of said hinges, a tubular member having its ends interfitting with said opposed end portions and supported thereby, and a flexible conductor member located in said hollow lugs and said tubular member for electrically connecting the heating elements in said casings.

3. In a waffle iron, the combination with a pair of co-operating casings, electric heating elements in said casings and a plurality of spaced hinge members on said casings, of a plurality of co-operating hollow members secured to the respective casings and having portions alined with the axis of said hinges, and means for electrically connecting said heating elements located in said hollow members.

In testimony whereof, I have hereunto subscribed my name this 16th day of April, 1924.

KARL EHRGOTT.